United States Patent
Chintalapalli Patta et al.

(10) Patent No.: US 12,084,133 B2
(45) Date of Patent: Sep. 10, 2024

(54) AUTONOMOUS SURFACE CRAWLING ROBOT

(71) Applicant: Tata Consultancy Services Limited, Mumbai (IN)

(72) Inventors: Venkat Raju Chintalapalli Patta, Banaglore (IN); Sri Sai Shyam Siddharth Gollu, Banaglore (IN); Swapnil Sunil Kalhapure, Banaglore (IN); Jithin Laiju Ravi, Banaglore (IN)

(73) Assignee: Tata Consultancy Services Limited, Mumbai (IN)

( * ) Notice: Subject to any disclaimer, the term of this patent is extended or adjusted under 35 U.S.C. 154(b) by 693 days.

(21) Appl. No.: 17/352,461

(22) Filed: Jun. 21, 2021

(65) Prior Publication Data

US 2021/0394841 A1 Dec. 23, 2021

(30) Foreign Application Priority Data

Jun. 22, 2020 (IN) .............................. 202021026330

(51) Int. Cl.
*B62D 55/265* (2006.01)
*B60K 1/02* (2006.01)
(Continued)

(52) U.S. Cl.
CPC .............. *B62D 55/265* (2013.01); *B60K 1/02* (2013.01); *B60L 50/66* (2019.02); *B62D 55/12* (2013.01);
(Continued)

(58) Field of Classification Search
CPC .. B62D 55/265; B62D 55/104; B62D 55/108; B62D 55/12; B62D 55/202; B62D 57/024; F15B 15/1447
(Continued)

(56) References Cited

U.S. PATENT DOCUMENTS 2,775,491 A * 12/1956 Ivory ................... B62D 55/265
305/161
7,546,891 B2 * 6/2009 Won ..................... B25J 11/0025
280/901
(Continued)

FOREIGN PATENT DOCUMENTS

| CN | 103129639 A | 6/2013 | |
|---|---|---|---|
| CN | 109466649 B | 5/2020 | |
| CN | 204355184 | * 5/2020 | ........... B62D 57/024 |

OTHER PUBLICATIONS

Translation of CN204355184, published May 27, 2015 (Year: 2015).*

*Primary Examiner* — Anne Marie M Boehler
(74) *Attorney, Agent, or Firm* — Finnegan, Henderson, Farabow, Garrett & Dunner, LLP (57) ABSTRACT

State of art techniques utilize active systems for stronger suction in surface crawlers while the passive approaches have limitation in providing consistent grip while moving across curved surfaces or dents. Embodiments herein provide an autonomous surface crawling robot for crawling over surfaces using electro-mechanical assembly for creating strong suction force and enabling the robot to smoothly crawl over flat surfaces, horizontal/vertical/inclined surfaces, curved surfaces, and surfaces with dents. Battery powered motors are used for only mobilization, while mechanical assembly generates suction to provide consistent grip across different type of surfaces. A dual flexible cam profile assembly including a cam profile and a guide rail generates required suction and addresses the technical challenge of maintaining suction across varying surfaces without using external power for suction generation. The dual flexible cam profile provides a robust, less prone to error or slippage type passive crawler mechanism, with consistent grip across uneven the surface.

5 Claims, 9 Drawing Sheets

(51) Int. Cl.
  *B60L 50/60* (2019.01)
  *B62D 55/108* (2006.01)
  *B62D 55/12* (2006.01)
  *B62D 55/20* (2006.01)
  *F15B 15/14* (2006.01)
  *F15B 15/20* (2006.01)

(52) U.S. Cl.
  CPC ........ *B62D 55/202* (2013.01); *F15B 15/1428* (2013.01); *F15B 15/1447* (2013.01); *F15B 15/20* (2013.01)

(58) Field of Classification Search
  USPC ................. 180/164, 9.1, 9.32, 901; 446/433
  See application file for complete search history.

(56) References Cited

U.S. PATENT DOCUMENTS

| | | | |
|---|---|---|---|
| 10,590,667 B2 | 3/2020 | Lin | |
| 2014/0299397 A1* | 10/2014 | Saylor, Jr. | B62D 55/265 180/164 |
| 2014/0311811 A1* | 10/2014 | Niederberger | B62D 55/265 901/1 |
| 2020/0079447 A1* | 3/2020 | Ohashi | B62D 57/024 |

* cited by examiner

AUTONOMOUS SURFACE CRAWLING ROBOT

PRIORITY CLAIM

This U.S. patent application claims priority under 35 U.S.C. § 119 to: India Application No. 202021026330, filed on Jun. 22, 2020. The entire contents of the aforementioned application are incorporated herein by reference.

TECHNICAL FIELD

The disclosure herein generally relates to the field of robotics, and, more particularly, to autonomous surface crawling robot.

BACKGROUND

Conventionally, manual labor is employed for tasks such as aircraft inspection, cleaning glass surfaces of tall building, inspecting boilers etc. Aircraft body is inspected periodically to detect wear, fatigue, interference, corrosion, and accidental damage. Currently, this inspection is done visually by a professional either alone or with aids, such as sensing mechanisms, to determine the condition of the unit so that judgements can be made. There are several concerns about visual inspection. A person performing visual inspection needs appropriate training so that they have the knowledge and experience to detect the defect. Additionally, unusual body positions may be difficult and tiring in completing the tasks.

The windows of a high building are cleaned by workers hanging outside the building. It is very dangerous since there is a possibility that workers might fall due to imbalance or damage to ropes.

Surface crawling robots can be used in these scenarios to overcome the challenges and improve efficiency. An efficient technique for crawling on the surface is to use vacuum grip or adhesion. State of the art robots that use vacuum adhesion, use either active or passive suction. In the robots that use active suction to create adhesion, there is a dedicated system such as vacuum pump or centrifugal fan that must be powered to continuously maintain vacuum. This consumes more electric energy and in turn reduces endurance or requires the robot to work as a wired robot. On the other hand, robots that use passive suction do not have a dedicated system to create vacuum. They rely on the force used to push the suction cup against the wall or surface to create and hold vacuum. Though these do not consume any additional power, they are significantly weaker in grip. Attempts have been made for passive wall climbing robots, however they seem to focus on flat surfaces like walls and do not discuss on challenges including uneven surfaces. To ensure strong grip along on uneven surfaces without any external suction assembly, the mechanical designs need to address the curvature suction to maintain consistent grip on flat as well as uneven surfaces. A further challenge in maintaining the grip arises when surfaces have dents.

SUMMARY

Embodiments of the present disclosure present technological improvements as solutions to one or more of the above-mentioned technical problems recognized by the inventors in conventional systems. For example, in one embodiment, an apparatus for crawling over surfaces is provided. The apparatus, also referred to as autonomous surface crawling robot comprises chassis with a symmetrical design comprising a plurality of tracked wheel platforms on one pair of opposite sides of the chassis, a plurality of battery powered motors mounted on the chassis, a plurality of sensors to sense a plurality of field parameters in an environment of the apparatus. Each tracked wheel platform from the plurality of tracked wheel platforms comprising a plurality of wheels functioning as a drive-slave wheel assembly, operated by the plurality of battery powered motors, to provide grip and movement of the apparatus along the surface. A drive wheel among the plurality of wheels connected to a plurality of piston-cylinder assemblies through a continuous loop mechanism, wherein the drive wheel transfers motion from the plurality of battery powered motors to the continuous loop mechanism to drive the plurality of piston-cylinder assemblies in a closed path. A closed loop flexible cam profile and a closed loop flexible guide rail serving as a dual flexible cam profile assembly configured to a) define movement path of the plurality of piston-cylinder assemblies, and b) periodically create, and release vacuum to control operation of mechanical actuation of the plurality of piston-cylinder assemblies.

The closed loop flexible guide rail defines movement path of each of a plurality of cylinders of the plurality of piston-cylinder assemblies driven by the continuous loop mechanism. The closed loop flexible cam profile defines an inward-outward position of each of a plurality of pistons of the plurality of cylinder assemblies. Each of the closed loop flexible guide rail and the closed loop flexible cam profile comprises a pair of spring assemblies along with a pair of flexible spring extension assembly, each on vertically opposite side each of the pair of spring assembly, which enables to synchronously contract or stretch each of the closed loop flexible guide rail and the closed loop flexible cam profile providing flexibility to retain surface contact when on a curved surface is encountered. A spring load in each of the plurality of pistons enables retaining the suction when dents are encountered on the surface, and a plurality of roller bearings in the closed loop flexible guide rail and the closed cam profile to transfer load for a mechanical actuation.

The shape of the cam profile is designed to a) actuate a piston of each of the piston-cylinder assemblies when a suction cup of the piston approaches the surface from side of the drive wheel while a cup surface of the suction cup being in parallel with the surface, and b) release the piston when the piston crosses a slave wheel among the plurality of wheels forcing the suction cup to withdraw from the surface. The apparatus holds on to the surface through suction created by the mechanical actuation and performs crawling over the surface using one or more repeated operation of the mechanical actuation in direction of the force applied by the drive wheel, wherein the crawling comprises at least one of a) continuous forward motion and b) a continuous backward motion and c) to-and-fro motion, in accordance with direction of rotation of the drive wheel. Further, the plurality of wheels, of each of the tracked wheel platform, functioning as a drive-slave wheel assembly, are configured to operate as the drive wheel or the slave wheel based on the length of the chassis. The plurality of battery powered motors operate the plurality of wheels of the drive-slave wheel assembly in accordance with a control signal, generated by one of an onboard controller or a remote controller, based on analysis of a plurality of field parameters sensed by a plurality of sensors.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Embodiments herein provide an apparatus, also referred to as an autonomous surface crawling robot or robot, for crawling over surfaces using electro-mechanical assembly for creating strong suction force and enabling the robot to smoothly crawl over flat horizontal/vertical/inclined surfaces, curved surfaces, and surfaces with dents. Although, the robot utilizes battery powered motors for mobilization, it generates strong suction using a mechanical assembly enabling consistent grip across uneven surfaces. The mechanical assembly disclosed herein comprises a dual flexible cam profile assembly having a closed loop mechanical structure that generates required suction and addresses the technical challenge of maintaining strong suction while the robot moves across uneven surfaces, without requiring external power for suction generation. Thus, the dual flexible cam profile assembly disclosed herein provides a robust passive crawler mechanism, which is less prone to error or slippage and maintains consistent grip across variation in the surface.

Referring now to the drawings, and more particularly to FIG. 1 through FIG. 9, where similar reference characters denote corresponding features consistently throughout the figures, there are shown preferred embodiments and these embodiments are described in the context of the following exemplary system and/or method. Reference numerals of one or more components of the autonomous surface crawling robot as depicted in the FIGS. 1 through 9 are provided in Table 1 below for ease of description:

TABLE 1

| Sl. No | Component | Numeral reference |
|---|---|---|
| 1 | autonomous surface crawling robot | 100 |
| 2 | Chassis assembly | 102 |
| 3 | Tracked wheel platforms | 104A-B |
| 4 | Continuous loop mechanism | 202 |
| 5 | Plurality of wheels (drive wheel and slave wheel) | 204A-B |
| 6 | plurality of piston-cylinder assemblies | 206A-N |
| 7 | Closed loop flexible cam profile | 302 |
| 8 | Closed loop flexible guide rail | 304 |
| 9 | Roller bearings | 402 |
| 10 | piston | 404 |
| 11 | cylinder | 406 |
| 12 | Suction cup | 408 |
| 13 | Battery powered motors | 602A-B |
| 14 | Pair of spring assembly | 702A-B |
| 15 | Pair of flexible string extension assembly | 704A-B |
| 16 | Flexible string extension | 802 |
| 17 | Slot | 804 |
| 18 | Spring load | 902 |

Figure 1:
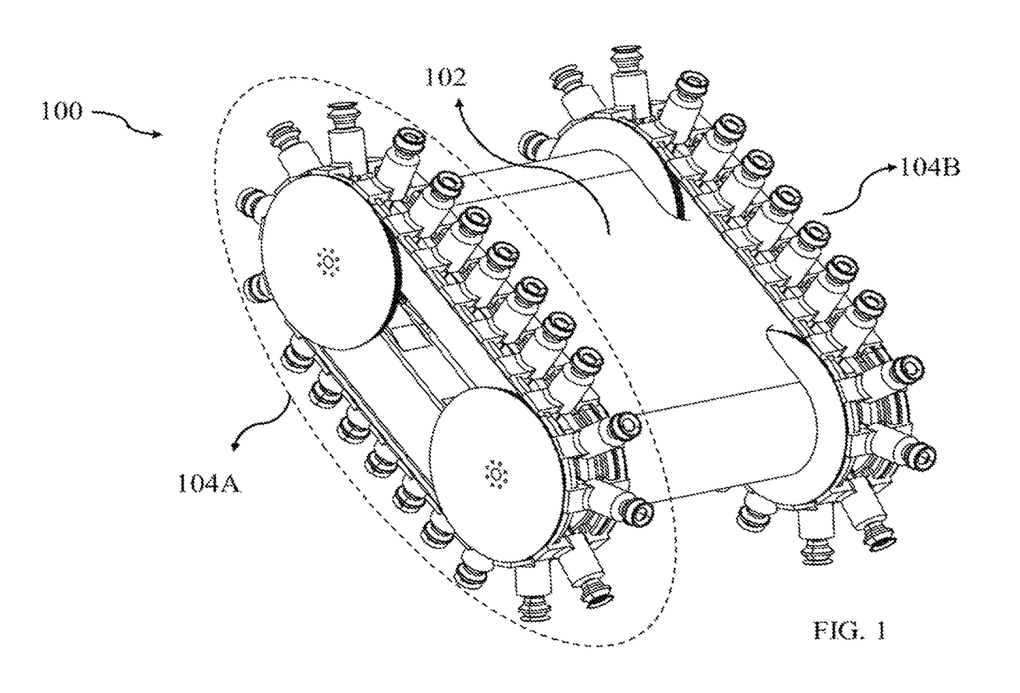
FIG. 1 illustrates a three-dimensional view of an apparatus, also referred to as an autonomous surface crawling robot, according to some embodiments of the present disclosure.

FIG. 1 illustrates an apparatus 100, also referred to as an autonomous surface crawling robot 100, according to some embodiments of the present disclosure. The autonomous surface crawling robot 100 or simply referred herein after as robot 100 comprises of a main body, interchangeably referred as to a chassis, 102 and two identical tracked wheel platforms 104A and 104B (also referred as plurality of tracked wheel platforms) present on either side of the chassis 102 providing a symmetrical design. The main body 102 further comprises a plurality of sensors (not shown) including but not limited to close-proximity vision sensors, lidar, etc. and electronics including battery (not shown), controller (not shown) etc. The plurality of sensors senses a plurality of field parameters in an environment of the apparatus 100 that can be analyzed by an onboard controller or a remote controller to decide on movement of the apparatus or robot 100. The onboard controller can be configured to generate signals to drive a plurality of motors 602A-B that operate the plurality of wheels 204A-B in accordance with the sensed field parameters and control logic of the controller, thus providing autonomous movement to the surface crawling robot 100. The tracked wheel platforms 104A-B drive the mechanism for grip and movement using the plurality of battery powered motors 602A-B, hence forth referred to as simply the plurality of motors 602A-B and are explained in conjunction with FIG. 6.

Figure 2:
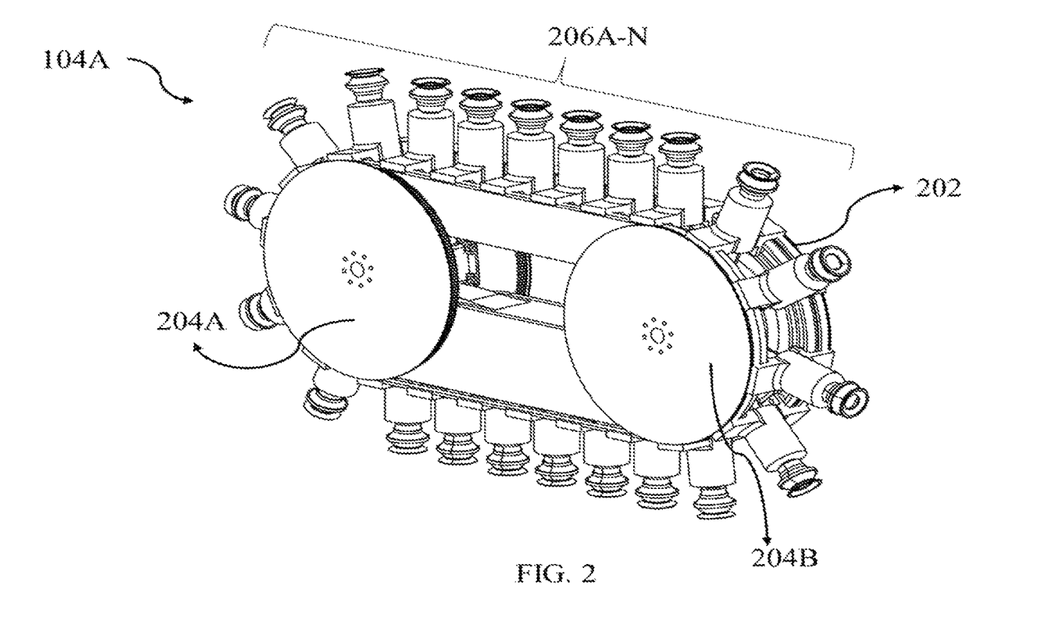
FIG. 2 is a partial view of the autonomous surface crawling robot of FIG. 1 depicting a tracked wheel platform, according to some embodiments of the present disclosure.

FIG. 2 is a partial view of autonomous surface crawling robot 100 of FIG. 1 depicting the tracked wheel platform 104A, according to some embodiments of the present disclosure. The tracked wheel platform 104A comprises a continuous loop mechanism 202 which connects a plurality of piston-cylinder assemblies 206A-N to the drive wheel 204A. The drive wheel 204A transfers motion from one or more motors among the plurality of motors to a) the continuous loop mechanism. b) to a closed loop flexible guide rail 304 which defines the movement path of the cylinders, and c) a cam profile 302 which defines the movement path of the pistons. Examples of the continuous loop mechanism 102 include but are not limited to a chain, a timing belt, or the like. The closed loop flexible guide rail 304 is interchangeably referred herein as guide rail. The closed loop flexible cam profile 302 is interchangeably referred herein as cam profile. The plurality of wheels, of each of the tracked wheel platform 104A-B, functioning as the drive-slave wheel assembly 204A-B, are configured to operate as one or more drive wheels (active wheels) and one or more slave wheels (passive wheels) based on the length of the chassis 102. For example, number of drive wheels can be increased when the length of the robot 100 increases. This enables better grip over the surface. Further, for the cam profile, wheels among the plurality of wheels 204A-B that are at corner of the chassis may not be sufficient enough to support the complete assembly, thus as required the robot 100 can have intermediate wheels, which can be either passive or active for additional support.

Figure 3:
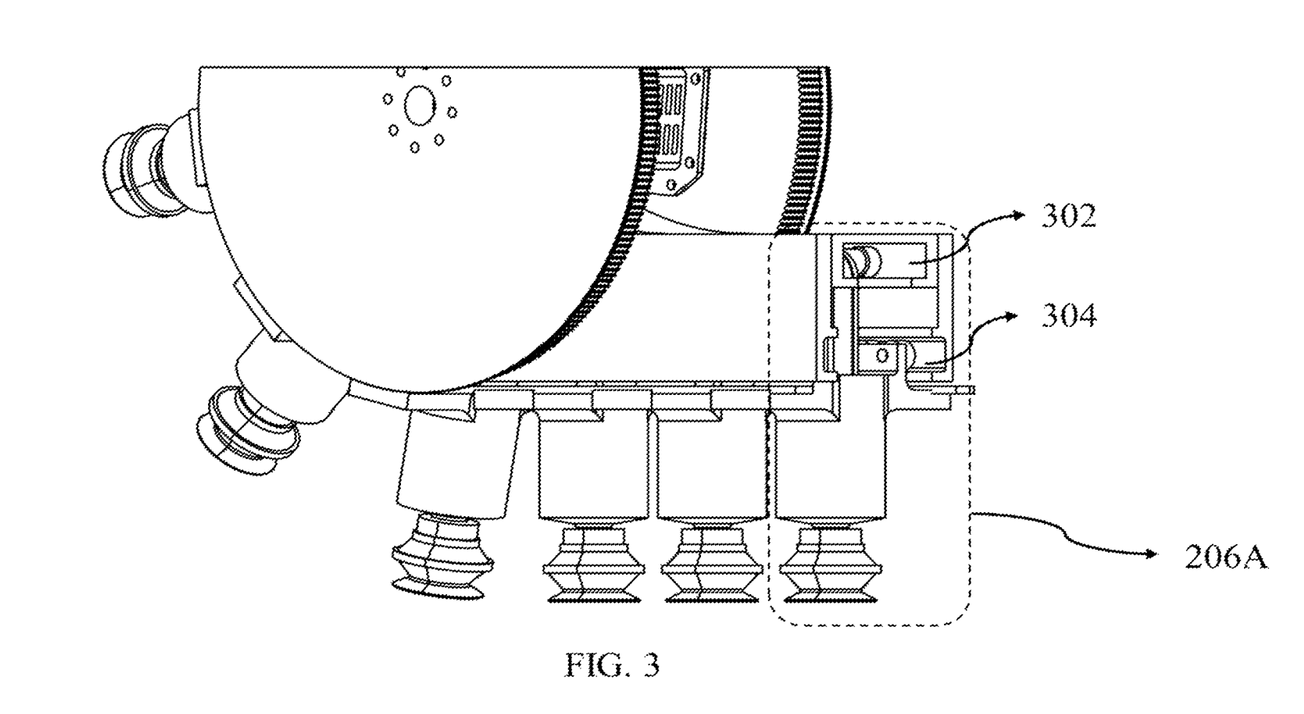
FIG. 3 is a vertical cross section of the tracked wheel platform illustrated in FIG. 2 depicting a dual flexible cam profile assembly supporting a piston-cylinder assembly, according to some embodiments of the present disclosure.
Figure 4:
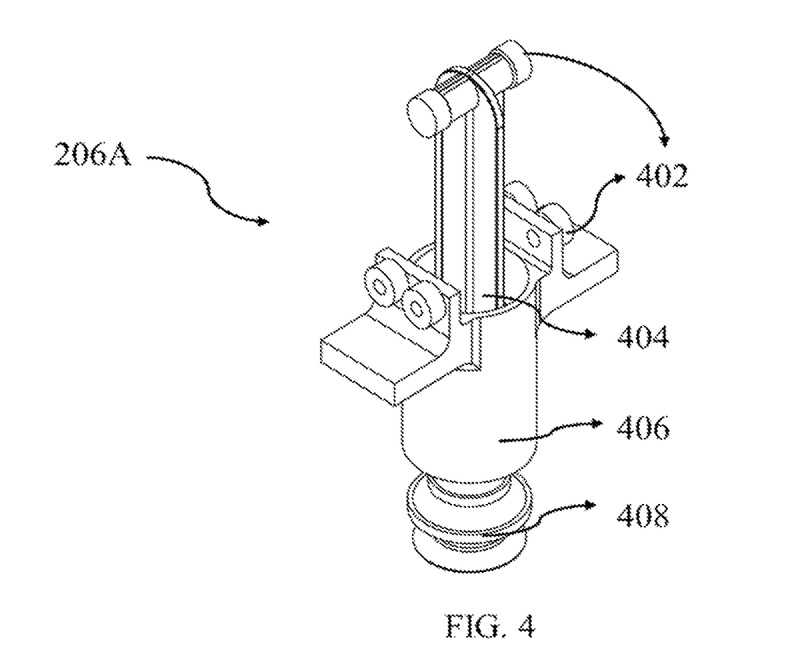
FIG. 4 illustrates an enlarged view of the piston-cylinder assembly of the tracked wheel platform of FIG. 2, according to some embodiments of the present disclosure.

FIG. 3 is a vertical cross section of the tracked wheel platform 104A illustrated in FIG. 2 depicting a dual cam profile assembly supporting the piston-cylinder assembly 206A, according to some embodiments of the present disclosure. FIG. 4 illustrates an enlarged view of the piston-cylinder assembly 206A installed/mounted on the continuous loop mechanism 202 of the tracked wheel platform 104A of FIG. 2, according to some embodiments of the present disclosure. FIG. 3 illustrates the cam profile 302 that holds roller bearings 402 for a piston 404, and the guide rail 304 that holds roller bearings 402 for a cylinder 406. The guide rail 304 and the cam profile 302 together define the movement path for piston-cylinder assembly 206A. The closed loop flexible guide rail 304 defines movement path of each of the plurality cylinders 406 of the plurality of piston-cylinder assemblies 206-N driven by the continuous loop mechanism 202. The closed loop flexible cam profile 302 defines an inward-outward position of each of a plurality of pistons 404 of the plurality of cylinders.

Thus, the piston-cylinder assembly 206A comprises the roller bearings 402, which are placed in the cam profile 302 and the guide rail 304. The piston 404 which is actuated by the cam profile 302 to create and release vacuum. A cylinder 406 of the piston-cylinder assembly 206A holds and releases the air as the piston 404 is actuated. Thus, vacuum is created at a suction cup 408 due to movement of the piston, effectively attaching the suction cup 408 to the crawling surface. The plurality of piston-cylinder assemblies 206A-N are installed/mounted on the surface of continuous loop mechanism 202, which is geared with the drive wheel 204A.

Figure 5A:
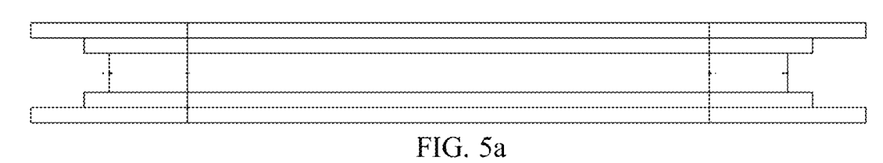
FIG. 5a shows top view of the tracked wheel platform of FIG. 2
Figure 5B:
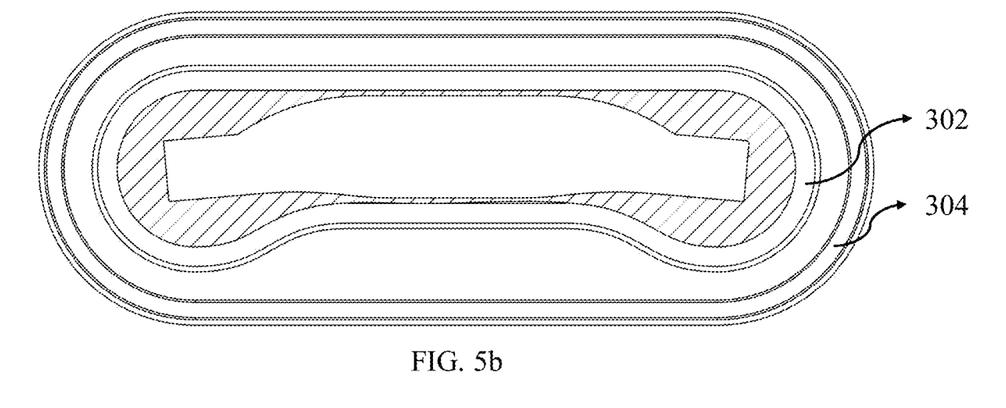
FIG. 5b is a horizontal cross-section (side view) of the tracked wheel platform of FIG. 2 depicting the dual flexible cam profile assembly, according to some embodiments of the present disclosure.

FIG. 5a shows top view of the tracked wheel platform of FIG. 2 and FIG. 5b is a horizontal cross-section (side view) of the tracked wheel platform of FIG. 2 depicting the dual flexible cam profile assembly, according to some embodiments of the present disclosure. More specifically, FIG. 5 illustrates the cam profile 302 and the guide rail 304. Flexibility is introduced in the cam profile 302 and the guide rail 304 to enable crawling with consistent grip when the robot 100 encounters uneven surfaces (e.g., curved surfaces and/or surfaces with dent). The mechanism for flexibility is explained in conjunction with FIGS. 7A through 9.

Figure 6:
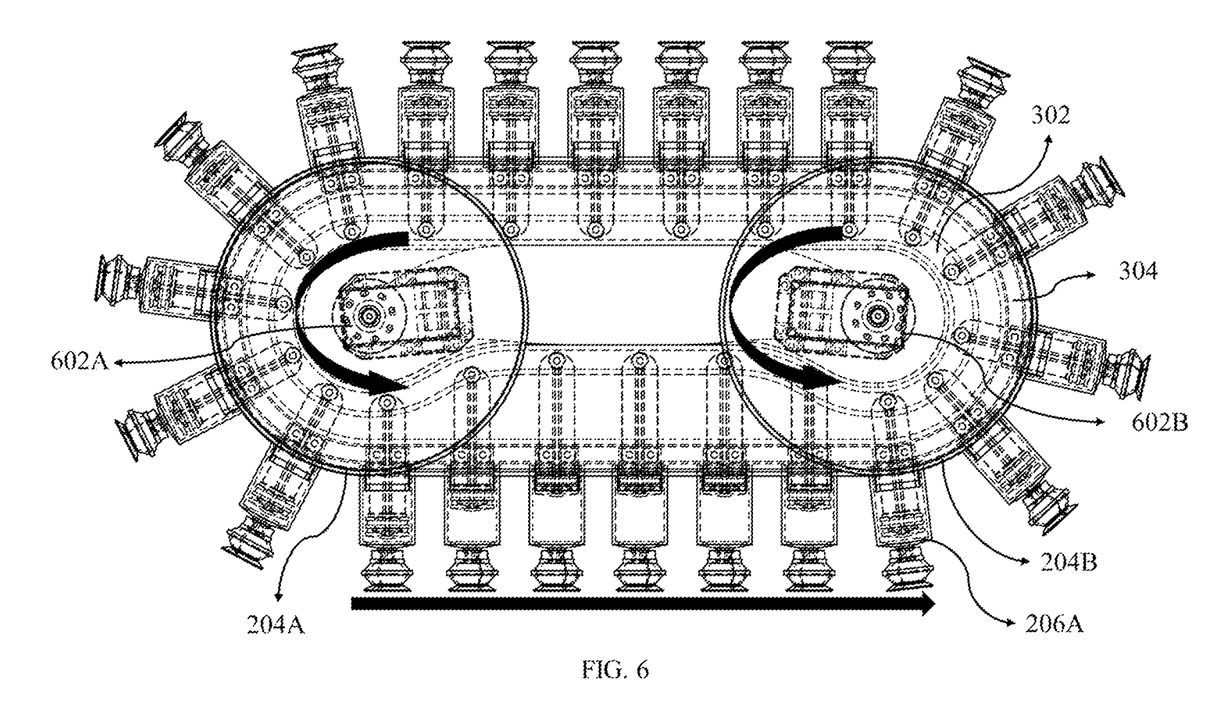
FIG. 6 illustrates movement and actuation of suction cups around the tracked wheel platform of FIG. 2 guided by the dual flexible cam profile assembly, according to some embodiments of the present disclosure.

FIG. 6 illustrates movement and actuation of the suction cups around the tracked wheel platform 104A of FIG. 2, according to some embodiments of the present disclosure. The cam profile 302 and the guide rail 304 guide the movement of cylinder(s) 406 and piston(s) 404, respectively. The shape of the cam profile 302 and the guide rail 304 are designed and/or configured to periodically create, and release vacuum as required and thus control the operation of mechanical actuation. The roller bearings 402 placed in the cam profile 302 and the guide rail 304 transfer the load to the cam profile 302 and the guide rail 304 respectively, while the drive wheel 204A and the continuous loop mechanism 202 transfer the motion to the cam profile 302 and the guide rail 304, respectively.

A plurality of cylinders like the cylinder 406 are installed on the surface of the closed loop mechanism 202 as illustrated in FIG. 3. Each of the suction cups 408 is attached to one end of corresponding cylinder as shown in FIG. 4. The continuous loop mechanism 202 is driven by the drive wheels 204A, forcing each of the cylinder 406 attached to the continuous loop mechanism 202 to move with it. The roller bearings 402 of the cylinder 406 sit (or are mounted) in the guide rail 304 as depicted in FIG. 3, which enables them to move in a defined path as the drive wheel 204A rotates. Each cylinder 406 is fitted with a piston 404 (an airtight piston) at other end as shown in FIG. 4. The roller bearings 402 on the other end of the piston 404 sit (or are mounted) on the cam profile 302, which guide the path of the pistons 404 as the drive wheel 204A rotates. The cam profile 302 and the guide rail(s) 304 together control the operation of mechanical actuation.

Initially, the piston 404 is in released position. When the roller bearings 402 located at the end of the piston 402 is pulled up by a deep curved end of the cam profile 302 as the suction cup approaches the surface from side of the driver wheel 204A, a vacuum is created by sucking out the air inside the suction cup 408 and the suction cup 408 grips itself to the surface. When the same roller bearing 402 is pushed down at other deep curved end of the cam profile 302 as it crosses the slave wheel 204B to move away from surface a, it releases the vacuum and allows the suction cup 408 to detach from the surface. The shape of the cam profile 302 is designed (or configured) to actuate the piston 404 when the suction cup 408 approaches the surface, and a cup surface of the suction cup 408 is being parallel with the surface on which the autonomous surface crawler 100 intends to crawl. Conversely, the piston 404 is released and the suction cup 408 withdraws from the surface as it crosses the slave wheel. This repeated on/off operation of the mechanical actuation enables the autonomous surface crawler 100 to crawl on the surface with continuous forward motion. Due to symmetry of the design, the robot can move backward just by changing the direction of rotation of the drive wheel 204A or move to-and-fro motion based on direction of movement of the drive wheel 204A.

The guide rail 304 is an outer profile, and it controls the path of the cylinders 406. The cam profile 302 is an inner profile, and it controls the path of the piston 404. In the mechanism disclosed herein, the cylinders are attached to the plurality of wheels by the means of the continuous loop mechanism 202, which define the path of the cylinders 406 to some extent. However, unlike some existing wall crawling mechanisms in the art, if a guide rail is not present, the cylinders 406 tend to have a well-defined path only while moving around the wheels, but when the cylinders 406 are moving in the space between the drive wheel 204a and the slave wheel 204B, the only support it has is the continuous loop mechanism 202 such as the timing belt. When the robot is moving vertically upward, absence of the guide rail may not directly affect the robot movement, but in other scenarios where movement is at an angle/inclination or horizontal, there is a possibility of sagging of the timing belt. This in turn affects the path of the cylinders 406 which results in loss of vacuum. This effect is more prominent as the length between the wheels increases, due to increase in length of the chassis 102. The incorporation of the guide rail 304 disclosed herein fully defines the path of the cylinders independently.

Essentially both the cam profile 302 and the guide rail 304 define the path, with specifically the cam profile 302 controlling the path of the pistons 404 and the guide rail 304 controlling the path of the cylinders 406. The guide profile 302, thus is a simple cam profile without any actuation region and guides the path of the cylinders 406 all around the circular path of the autonomous surface crawling robot 100.

Figure 7A:
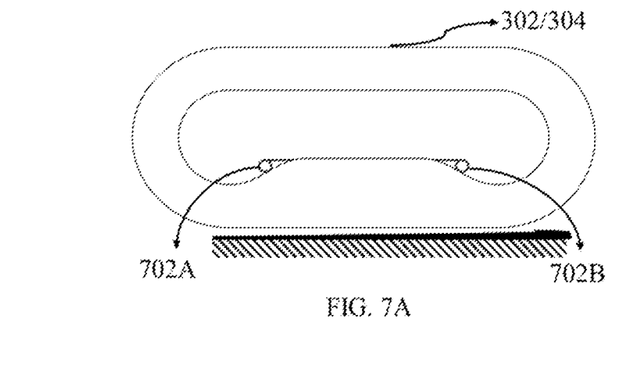
FIG. 7A through 7C depict a mechanism in the dual flexible cam profile assembly enabling the autonomous surface crawling robot to crawl on curved surface, according to some embodiments of the present disclosure.
Figure 7B:
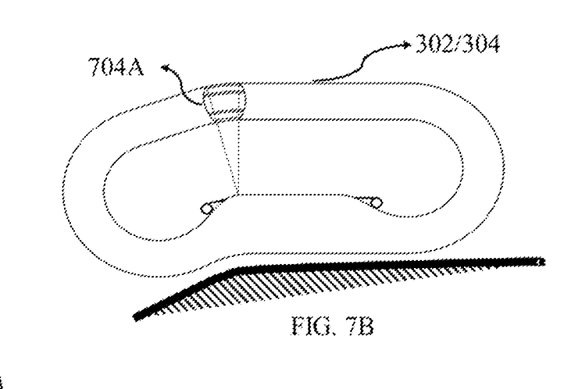
Figure 7C:
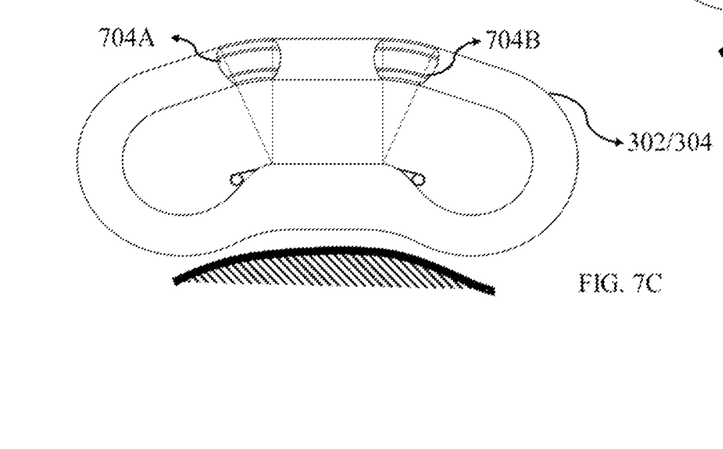
Figure 8A:
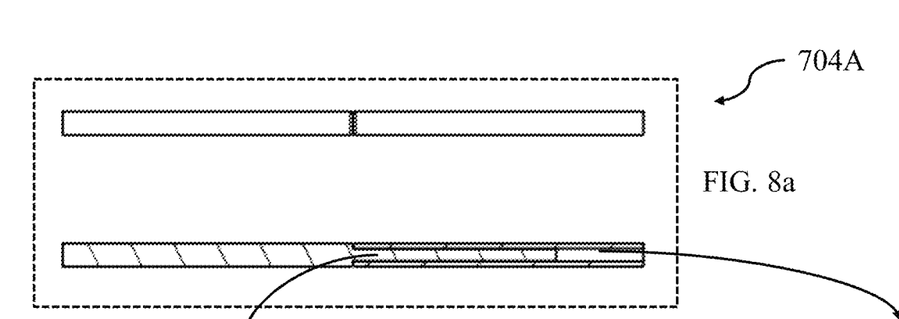
FIG. 8a shows a mechanism in the dual flexible cam profile assembly and FIG. 8b depicts enlarged view of the mechanism in the dual flexible cam profile assembly of FIG. 8a, according to some embodiments of the present disclosure.
Figure 8B:
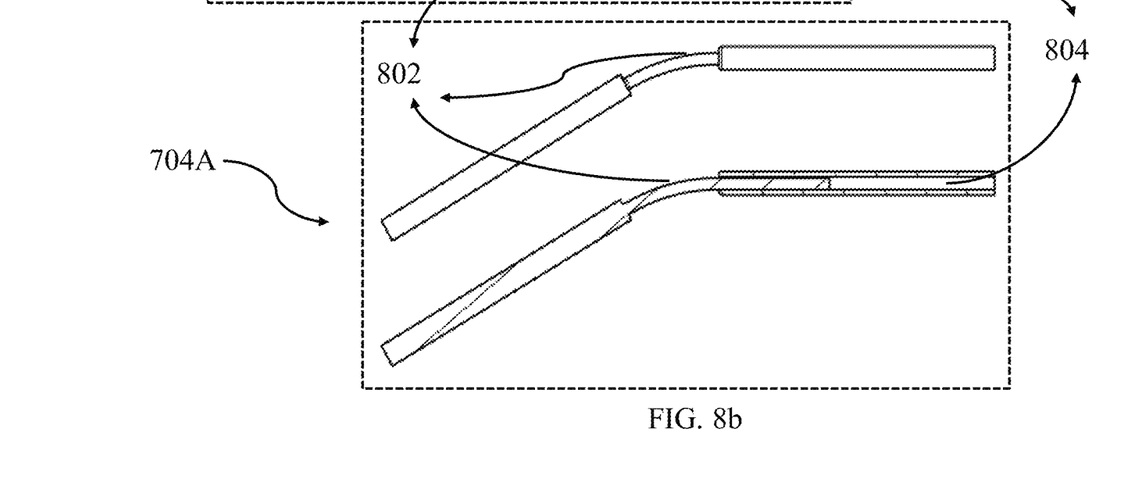

FIG. 7A through 7C depict a mechanism in the dual flexible cam profile assembly enabling the autonomous surface crawling robot 100 to crawl on curved surface, according to some embodiments of the present disclosure. FIGS. 7A, 7B and 7C depicts shape of both the cam profile 302 and the guide rail 304 (commonly referred here as profile) when crawling on a flat surface, a flat to curved surface, and a curved surface respectively using a pair of spring assemblies (spring assembly 702A and spring assembly 702-B) and a pair of flexible spring extension assemblies 704A-B. The FIG. 8a shows a mechanism in the dual flexible cam profile assembly and FIG. 8b depicts an enlarged view of the mechanism in the dual flexible cam profile assembly of FIG. 8a, according to some embodiments of the present disclosure. Each of the closed loop flexible cam profile 302 and the closed loop flexible guide rail 304 comprises the pair of spring assemblies 702A-B. One spring assembly is present at each end of a) the drive wheel 204A and b) the slave wheel 204B. A pair of flexible spring extension assemblies 704A-B are present on vertically opposite side of each of the pair of spring assemblies 702A-B. This mechanism enables synchronous contracting or stretching each of the closed loop flexible cam profile 302 and closed loop flexible guide rail 304. This enables the robot 100 to provide flexibility to the retain surface contact when a curved surface is encountered. Further, as depicted in FIG. 9b a spring load 902 in each of the plurality of pistons (piston 404) enables retaining the suction when dents are encountered on the surface. A flexible extension 802 as depicted can be for example thin metal strips, with a slot 804 at a center part of the profile. The extensions of the side parts fit into the slots of the center part. While moving on a flat surface, the pair of spring assemblies 702A-B remain unactuated, and this assembly stays intact as in FIG. 7A. Further, as in FIG. 7B, while moving from flat to curved surface, a spring 702A from the pair of spring assemblies 702A-B gets actuated and the flexible extension 704A of the respective side of the profile, slide out and allow the profile to bend to accommodate the curvature of the path. Similarly, on an entirely curved surface as in FIG. 7C the pair of spring assemblies 702A-B are actuated, and the pair of flexible spring extension assemblies 704A-B are pulled to maintain the proximity and grip over the curved surface.

Figure 9A:
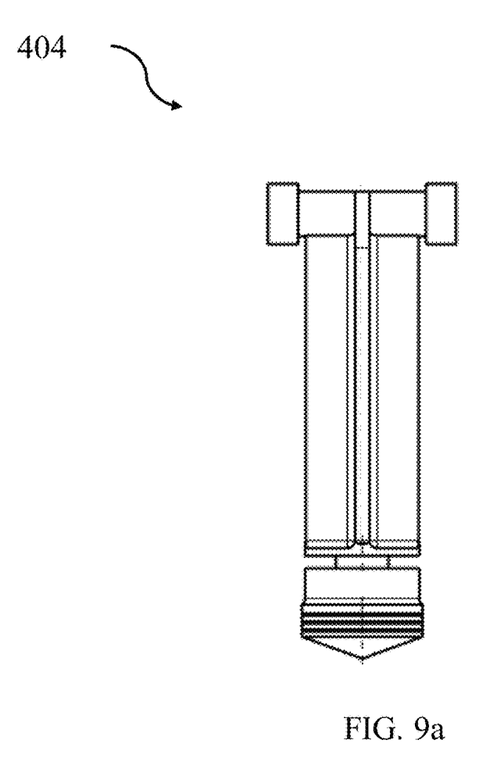
FIG. 9a shows sectional view of a mechanism in the dual flexible cam profile assembly and FIG. 9b depicts non-sectional view of the mechanism in the dual flexible cam profile assembly enabling the autonomous surface crawling robot to crawl on surface with dents, according to some embodiments of the present disclosure.
Figure 9B:
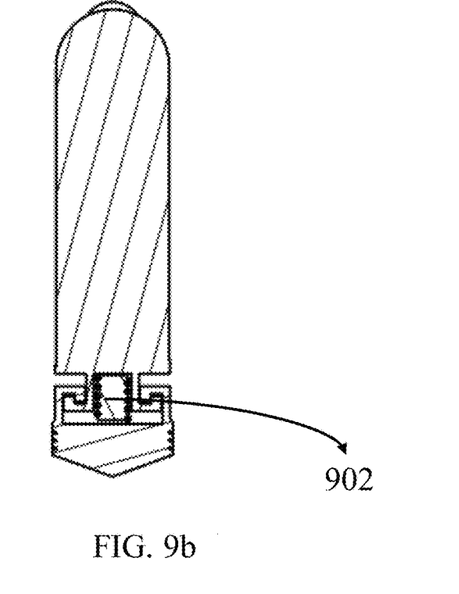

FIG. 9a shows sectional view of a mechanism in the dual flexible cam profile assembly and FIG. 9b depicts non-sectional view of the mechanism in the dual flexible cam profile assembly enabling the autonomous surface crawling robot 100 to crawl on surface with dents, according to some embodiments of the present disclosure. The FIG. 9 depicts the piston 404 and a cross sectional view of the piston 404 The additional spring load 902 in the piston 404 ensures required creation of vacuum when dents are encountered on the crawling surface.

Thus, the apparatus disclosed enables stronger adhesion or grip and less consumption of electric power, since vacuum is created in the suction cup by the actuation of piston(s), which is regulated by the cam profile. By using this mechanism, grip that is stronger than existing passive systems is created without consuming power for suction generation, as required by any active system.

Unlike state of the art approaches, the apparatus 100 is lightweight due to absence of vacuum pump for creating an extra vacuum. Further, the apparatus 100 operates with less vibrations and less heat generation which results in a higher life span.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

We claim:

1. An apparatus for crawling over a surface, the apparatus comprising:
 a chassis with a symmetrical design comprising a plurality of tracked wheel platforms on one pair of opposite sides of the chassis, a plurality of battery powered motors mounted on the chassis;
 each tracked wheel platform from the plurality of tracked wheel platforms comprises a plurality of wheels functioning as a drive-slave wheel assembly, operated by the plurality of battery powered motors, to provide grip to, and movement of the apparatus along the surface;
 a drive wheel among the plurality of wheels connected to a plurality of piston-cylinder assemblies through a continuous loop mechanism, wherein the drive wheel transfers motion from the plurality of battery powered motors to the continuous loop mechanism to drive the plurality of piston-cylinder assemblies in a closed path; and
 a closed loop flexible cam profile and a closed loop flexible guide rail serving as a dual flexible cam profile assembly, wherein the dual flexible cam profile assembly is configured to a) define movement path of the plurality of piston-cylinder assemblies, and b) periodically create, and release vacuum to control operation of mechanical actuation of the plurality of piston-cylinder assemblies, wherein
 a) the closed loop flexible guide rail defines the movement path of each of a plurality of cylinders of the plurality of piston-cylinder assemblies driven by the continuous loop mechanism,
 b) the closed loop flexible cam profile defines an inward-outward position of each of a plurality of pistons of the plurality of piston-cylinder assemblies,
 c) each of the closed loop flexible guide rail and the closed loop flexible cam profile comprises a pair of spring assemblies, along with a pair of flexible spring extension assemblies, each on vertically opposite side of each of the pair of spring assemblies, which enables to synchronously contract or stretch each of the closed loop flexible guide rail and the closed loop flexible cam profile providing flexibility to retain surface contact when a curved surface is encountered,
 d) a spring load in each of the plurality of pistons is configured to retain the vacuum when dents are encountered on the surface, and
 e) a plurality of roller bearings in the closed loop flexible guide rail and the closed cam profile to transfer load for the mechanical actuation.

2. The apparatus of claim 1, wherein shape of the cam profile is configured to:
 a) actuate a piston of each of the piston-cylinder assemblies when a suction cup of the piston approaches the surface from side of the drive wheel while a cup surface of the suction cup being in parallel with the surface, and
 b) release the piston when the piston crosses a slave wheel among the plurality of wheels while moving away from the surface and forcing the suction cup to withdraw from the surface.

3. The apparatus of claim 2, wherein the apparatus holds on to the surface through the vacuum created by the mechanical actuation and performs crawling over the surface using one or more repeated operations of the mechanical actuation in direction of the force applied by the drive wheel, and wherein the crawling comprises at least one of a) continuous forward motion and b) a continuous backward motion, and c) to-and-fro motion, in accordance with direction of rotation of the drive wheel.

4. The apparatus of claim 1, wherein the plurality of wheels, of each tracked wheel platform, functioning as the drive-slave wheel assembly, are configured to operate as the drive wheel or the slave wheel.

5. The apparatus of claim 1, wherein the plurality of battery powered motors operate the plurality of wheels of the drive-slave wheel assembly in accordance with a control signal, generated by one of an onboard controller or a remote controller, based on analysis of a plurality of field parameters sensed by a plurality of sensors mounted on the chassis.

* * * * *